Jan. 16, 1951  A. B. JONES  2,538,365
PIPE LAYING DEVICE
Filed May 15, 1945  2 Sheets-Sheet 1
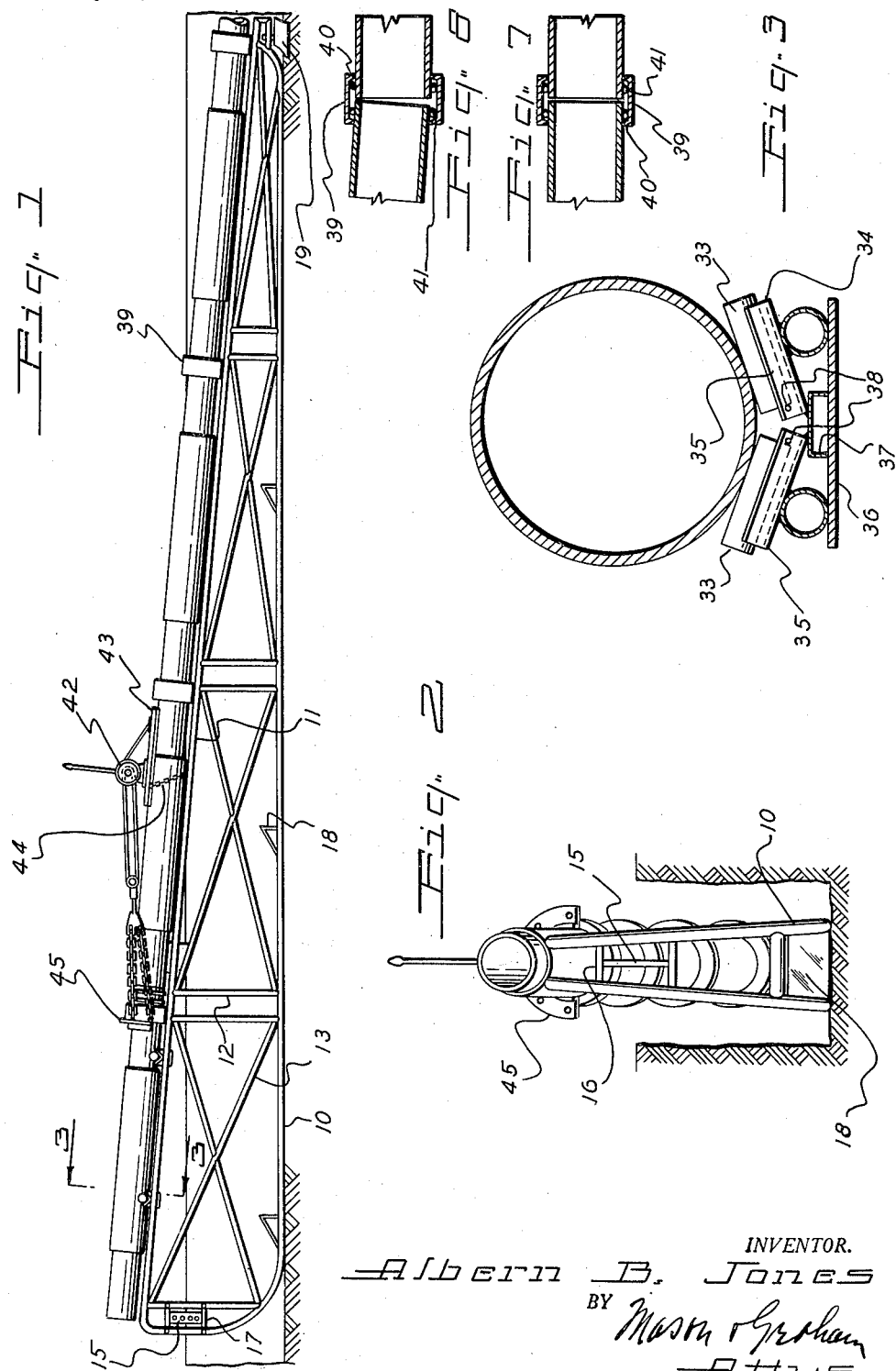
INVENTOR.
Albern B. Jones
BY Mason & Graham
Attys.

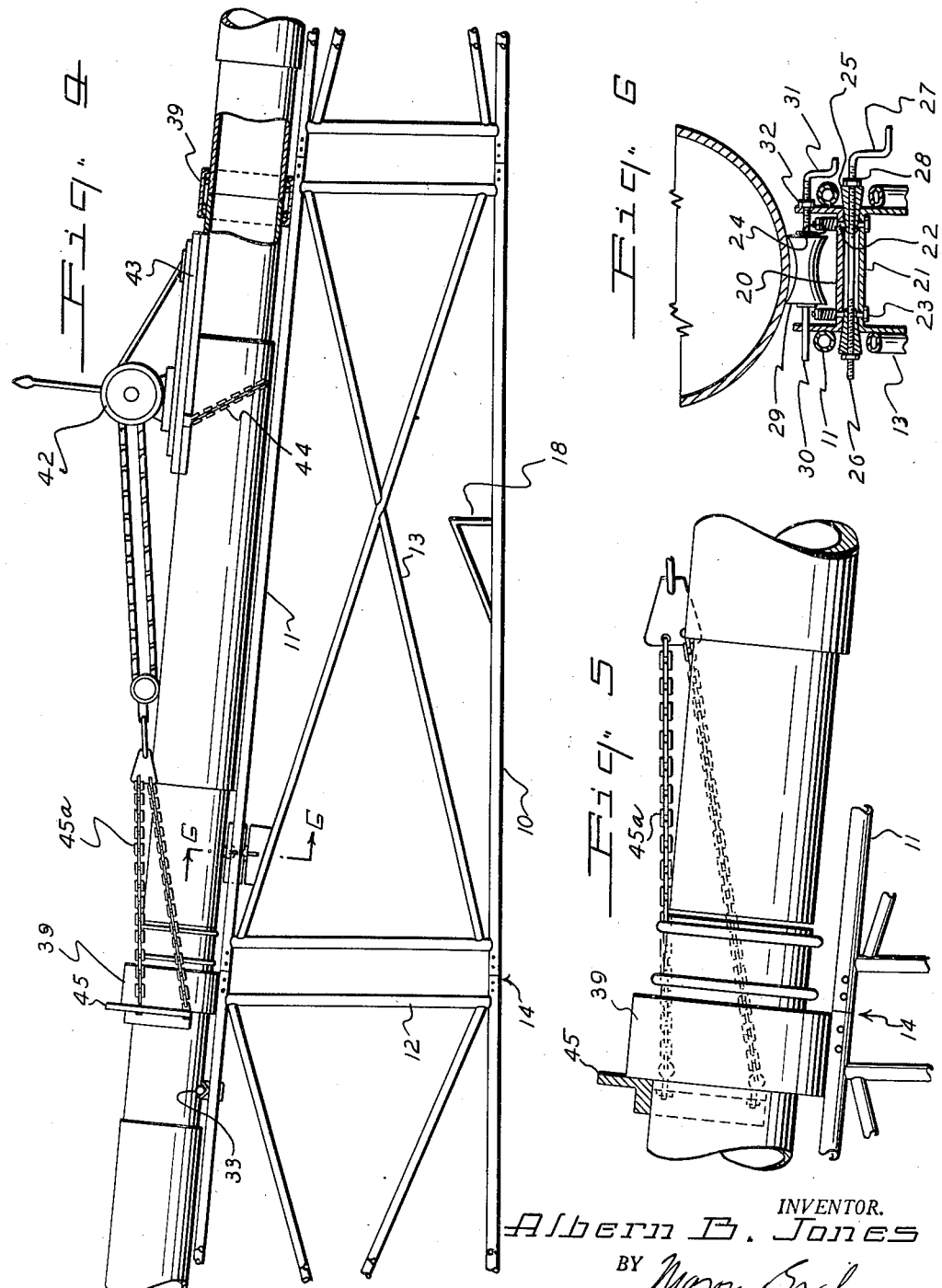

Patented Jan. 16, 1951

2,538,365

UNITED STATES PATENT OFFICE 2,538,365

PIPE LAYING DEVICE

Albern B. Jones, Alhambra, Calif.

Application May 15, 1945, Serial No. 593,846

3 Claims. (Cl. 111—5)

My invention relates to a method of and means for laying pipe in trenches, or in water, or under other conditions in which the lengths of pipe are not formed into a pipe line extending above the ground.

As generally practiced, the laying of pipe in trenches is an expensive and time consuming operation. It is necessary to dig the trench, often to depths requiring support of the trench sides, properly level the bottom, dig enlargements of the trench at points where lengths of pipe are to be jointed together, and to use equipment to lower the larger sizes of pipe into the trench. Further, it is difficult to properly inspect joints made up with the pipe in the trench.

Recent developments in forms of joints and in materials from which the pipe is made, while enabling pipe lines to be more rapidly constructed and providing desirable characteristics in the pipe, at the same time require careful handling of the pipe, and especially require care in making up the pipe joints; for instance, provision has to be made for expansion when the pipe becomes water soaked.

In order to overcome the disadvantages of joining lengths of pipe in the trench while at the same time performing finishing operations on the bottom of the trench, I have provided a method whereby the joining of lengths of pipe to the end of a string of pipe is carried out above the trench in a continuous manner, the lengths of pipe being supported until laid in the trench at less than the maximum angle of inclination, proper for the type of pipe and joint being laid, of one length of pipe to adjacent lengths of pipe. Further, according to my device and method, the bottom of the trench is levelled and may be provided with a furrow to receive the pipe during the operation of laying the pipe.

My invention particularly relates to a support enabling lengths of pipe to be joined together above the ground and lowered into the trench while at the same time performing certain operations on the trench bottom.

Although it is not so limited, the invention is particularly designed to be used with asbestos composition type pipe joined with rubber packed joints, since this type of pipe, while possessing valuable advantages, requires more careful handling than standard forms of metal pipe. The invention will be described hereinafter as applied to the laying of pipe of the type referred to but it is to be clearly understood that the invention is adapted for use with other types of pipe, such as welded steel pipe, and the invention is therefore not in any way limited by the hereinafter described embodiment of the invention but only as indicated by the scope of the appended claims.

An object of the invention is to provide a movable support adapted to support the end length of a string of completed pipe in a convenient position above the bottom of the trench, preferably above the top of the trench, and to receive an additional length of pipe and maintain it in position to be joined to the string of pipe by any desired procedure, as for instance by making up a joint or by welding.

Another object of the invention is to provide a movable support, for use in pipe laying, fitted with means for aligning lengths of pipe in position on the support.

Another object of the invention is to provide a movable support for use in pipe laying fitted with means for accurately aligning the end of a string of pipe by adjustment both vertically and/or transversely of the support with the end of an additional length of pipe to be joined thereto.

A further object of the invention is to provide a movable support or sled for use in pipe laying fitted with means acting to smooth or level the bottom of a trench cut to receive the pipe line, and along the bottom of which the sled is moved.

Another object of the invention is to provide a movable support for use in pipe laying, adapted to be moved along the bottom of the pipe trench, with means for forming a furrow along the bottom of the trench in which the pipe is laid.

A further object of the invention is to provide a movable support or sled for use in pipe laying so arranged that, as the sled is moved forwardly after a length of pipe has been joined by an expansion joint to a string of pipe, the abutting ends of the pipe are caused to take up proper positions to allow for expansion in the joint, when the pipe is laid in the trench.

A still further object of the invention is to provide a movable angular support for use in laying pipe and which may be readily demounted for transportation to another site, or to storage.

Yet another object of the invention is to provide a method of laying pipe by which the jointing of lengths of pipe to a string of pipe and the laying of pipe in a trench is facilitated.

Further features and objects of the invention will hereinafter appear from the following description and by reference to the accompanying drawings.

In the drawings:

Fig. 1 is a side elevation of the pipe laying sled;

Fig. 2 is a front elevation of the sled;

Fig. 3 is a section on the line 3—3, Fig. 1;

Fig. 4 is a detail view to an enlarged scale of part of the sled showing a joint in process of being drawn up, and a made up joint in section;

Fig. 5 is a detail view to an enlarged scale showing the arrangement of the rubber packing rings in position and a coupling about to be made up;

Fig. 6 is a fragmentary section on the line 6—6, Fig. 4, to an enlarged scale;

Fig. 7 is a diagrammatic representation of the position of the ends of the pipe in a joint when the pipe is in position in the trench; and Fig. 8 is a diagrammatic representation of the manner in which the ends of the pipe in a joint are aligned while moving off the sled into the bottom of the trench.

Referring now to Fig. 1, it will be seen that the supporting carriage or sled is in the form of an elongated structure and in the form shown is specifically designed to be pulled along the bottom of a trench in which the pipe line is to be laid. At the forward end the support is sufficiently high to enable additional lengths of pipe to be joined to a string of pipe above the level of the ground. When a length of pipe has been so joined, the support or sled is pulled along the bottom of the trench sufficiently to enable another length of pipe to be placed in position to be joined to the previously joined length, so that as the sled is intermittently moved forwardly along the bottom of the trench, the newly joined sections of pipe slide off the sled into position in the trench.

The sled comprises two longitudinally extending runners 10, inclined top rails 11 supported from the runners by vertical members 12 and preferably diagonally braced by members 13 in order to form a sturdy structure that will withstand the stresses imposed by pulling the sled along the bottom of the trench, as well as by the weight of the lengths of pipe extending along the upper surface thereof. To facilitate transportation of the sled the structure is preferably made in sections which may be readily joined. For this reason the vertical members are doubled and a simple pin and socket joint is arranged between the top and bottom members, as indicated at 14 in Figs. 4 and 5. While any suitable structural members may be employed to form the sled, I have found that ordinary steel pipe welded together, except at the joints, performs very well in service.

In order to afford a hitch for connection to a tractor, a plate 15 is welded at the front of the sled and is preferably provided with a plurality of apertures through which a towing hook may be passed. This plate is arranged centrally of the sled by being welded to struts 16 extending between the front vertical columns and bracing members 17. The plate may be welded between the columns and the upturned front ends of the runners which join the front ends of the top rails.

In laying certain types of pipe which require particularly careful handling, it is important that the floor of the trench be made level in order that stresses on the pipe, due to uneven support, are avoided. For this purpose I provide scraper blades 18 extending between the runners and having the form of inclined plates level at their lower edges with the bottom of the runners. These plates act to catch any high points in the bottom of the trench and shear off the material which slides up over the plate and is scattered by falling over the top edge thereof. By arranging a plurality of these blades, one behind the other, the material is evenly spread over the bottom of the trench.

To aid in positioning the pipe in the bottom of the trench, it is advantageous to form a furrow in which the pipe will lie and in which it is less likely to be displaced from proper position during the filling in of the earth dug from the trench. For the purpose of making this furrow I provide a suitably shaped blade 19 carried at the rear end of the support structure. Any suitable means may be provided for adjusting the blade.

A primary function of the support or sled is to accurately align the abutting ends of a new section of pipe and of the end section of the string of pipe. These means comprise an arrangement for bringing the end section of the string of pipe extending to the rear of the sled in both vertical and lateral directions as fully shown in Fig. 6 and as indicated in Fig. 1. These means comprise a bracket 20 with the sides upwardly directed. Bracket 20 is supported on a second bracket 21 with sides downwardly directed and connected as by welding to diagonal bracing members 13. The upper bracket is resiliently urged toward and positioned upon the lower bracket by stems 22 passing through bores in both brackets and provided with heads 23 engaging against the under side of the lower bracket and with abutments such as afforded by a nut screwing on threads formed at the upper ends of the stems. Spiral springs 24 are arranged between the abutment and the upper surface of the upper bracket. In order to adjust the vertical height of the upper bracket on the lower, I provide two oppositely inclined conical adjustment pieces 25 inserted between the upper and lower brackets. The coned adjustment pieces 25 are provided with threaded bores, the threads being left-hand in one piece and right-hand in the other. A threaded stem 26 is screwed into the two adjustment pieces and one end is bent into a crank 27. Rotation of the stem will result in the adjustment pieces being either moved toward each other or away from each other, according to the direction of rotation of the stem. Lock nuts 28 are provided, by which a desired adjustment may be maintained. If the adjustment pieces 25 are moved together the upper bracket evidently will be raised from the lower bracket, while movement apart of pieces 25 will enable springs 24 to move the upper bracket 20 downwardly.

In order to adjust the lateral position of the end length of the string of pipe on the sled, and to support it, I mount a concavely curved roller 29 on a spindle 30 passing between the sides of the upper bracket. Roller 29 is held against displacement laterally of the stem by any suitable means. The spindle 30 may be displaced laterally by means of a thread formed at one end thereof engaging in a threaded bore in the side of the upper bracket and may be rotated by a crank 31 formed at one end thereof. A lock nut 32 is provided by which desired adjustment of the stem and coned roller may be maintained. It will be seen that rotation of the stem will move the coned roller in axial direction transversely of the top of the support.

To properly position the length of pipe to be joined to the end of the string of pipe, I provide at the forward end of the sled, sets of inclined rollers 33 (Fig. 3) suitably supported. The supports may be of any desired construction, that shown comprising two lengths, 34, 35, of angle material welded at their upper ends to the side rails, the angles being inclined inwardly and downwardly and supported at their inner ends by a plate 36 welded across the underside of the top rails and carrying a supporting piece 37 between the side members to which the inner ends of the angle pieces may be welded.

I have found that the rolling elements may be satisfactorily formed from short lengths of pipe of suitable diameter resting in the angle material and prevented from working downwardly therein by means of an abutment such as furnished by a bolt 38 passed through bores at the inner ends of the angle pieces in position to engage the lower edge of the sections of pipe. With proper lubrication it is found that this roller construction is efficient for its purpose.

The structure described will accurately align the forward end of the last section added to a string of pipe and the rearward section of a new length of pipe to be attached to the string. Since the joint to be made is supported clear of the trench or surface of the ground, any method of connecting the pipes may be employed as, for instance, by an automatic welding machine carried on the top of the sled, or by manual welding. The means shown in the drawings is particularly intended for joining lengths of composition pipe by the use of joints including rubber packing rings. Such pipe is widely used and is very satisfactory in service but requires that the joint be carefully made. A section through a made-up joint of this type is shown at the right in Fig. 4 and also in Figs. 7 and 8. It will be seen that the joint consists of a sleeve 39 which is pulled over the rubber packing rings 41. It is essential, in view of the fact that there is no positive retaining means for the rings, that they should be rolled into position accurately. This involves accurate alignment of the abutting ends of the pipe section and also uniform resistance of the surface of the pipe at the joint. If the surface ends of the pipe do not afford uniform resistance the rubber rings will not roll accurately into position and a leaky joint will result.

By making up the joint above the ground the condition of the surface of the pipe of the joint can be readily controlled since the operation is carried out above the ground, whereas when carried out in the trench it is difficult to be sure that the surface of the pipe on the underside of the joint is in proper condition. By making the joint above ground level the pipe can be kept dry and a satisfactory joint can be relied on and thorough inspection of the joint is facilitated Very considerable pressure has to be applied to effect lateral displacement of the sleeve 39 to make a joint since an inwardly thickened portion 40 is provided at each end, and one of these thickened portions has to be forced over the rubber rings 41.

I have shown in the drawings a manually operated jack 42 resting on a saddle 43 placed on the pipe and attached by a length of chain 44 secured to one side of the saddle and adjustably secured to the opposite side of the saddle. When the pulling means extending between the jack and the collar are put under tension the chain will securely grasp the pipe with equal tension around its periphery and avoid any crushing of the pipe.

An arcuate yoke 45 is placed over the pipe in position to engage against the sleeve 39, and chains 45a are secured to this collar. It has been found that two lengths of chain on each side of the pipe, the lower of which is slightly below the center line of the pipe and connected to an equalizer 42, to which the jack chain is secured, will result in a satisfactory pull being exerted on the yoke to force the collar over the rubber rings.

A detail view of this method of attachment of the yoke to the equalizer is shown in Fig. 5, which also shows the aligned ends of the string of pipe and of the new length of pipe to be joined thereto with the rubber rings in position on the new length of pipe. It will be noted that in this view a gap is shown between the ends of the pipe but as soon as pull is applied by the jack, the pipe ends will be brought into close contact, which is necessary in order that the forward ring may roll over the abutting ends into position. It will be noted that the abutment of the ends of pipe is shown in the sectioned portion of Fig. 4. When finally laid in position in the trench, however, the ends of the pipe should be spaced sufficiently to allow expansion of the pipe to take place and it is an important feature of my invention that this expansion joint is automatically provided for. The angle of inclination of the top of the pipe support should not be greater than that permissible for the type of pipe for which the sled is particularly designed, which amounts to about 5° for asbestos composition pipe.

The movement of the ends of the pipe in the joint is shown in Figs. 7 and 8. Fig. 8 shows the ends of the pipe pulling apart at the bottom of the joint as the joint passes off the end of the sled, while Fig. 7 shows the relation of the ends of the pipe in the joint when the length of pipe ahead of the joint is also passed off the sled and is lying in the trench. It will be seen that, owing to the resiliency of the rubber packing rings, the ends of the pipe have been positioned apart by a small amount, thus providing a gap serving to allow expansion of the pipe.

By the use of my method of joining lengths of pipe intended to form a string of buried pipe the amount of labor and time is largely reduced as compared with that necessary in following standard practices, while at the same time the work is done with greater accuracy and is more easily inspected.

Various changes and modifications may be made in the pipe laying means of my invention by those familiar with the art without departing from the scope of the invention as indicated by the scope of the appended claims.

I claim:

1. A pipe laying device comprising: a carriage adapted to be moved along a surface upon which a string of joined sections of pipe is being laid, said carriage having a top surface formed to support in alignment the last section of pipe joined to the string and the next section of pipe to be joined to the string, said surface being inclined in the direction of its movement; and adjustable means on the carriage adapted to partially support one of the pipe sections for moving the same into alignment with the other, comprising a roller extending transversely of the carriage for a pipe section to rest on, a bracket mounted on said carriage for rotatably supporting said roller, means for vertically adjusting said bracket, and means for adjustably positioning said roller relative to said bracket transversely of said carriage.

2. A pipe laying device comprising: a carriage having a pair of runners, a pair of inclined top rails above said runners, and bracing means connecting said runners and said rails, a plurality of pipe supporting rollers mounted on said top rails in spaced relation longitudinally therealong and extending transversely thereof, and a pipe aligning and supporting roller mounted on said top rails, said roller being adjustable vertically and transversely of said carriage.

3. A pipe laying device comprising: a carriage having a pair of runners, a pair of inclined top rails above said runners, and bracing means connecting said runners and said rails, a plurality of pairs of pipe supporting rollers mounted on said top rails in spaced relation longitudinally therealong and extending transversely thereof, the rollers of each pair being inclined relative to each other to form a V-shaped cradle, and a pipe aligning and supporting roller mounted on said top rails, said roller being adjustable vertically and transversely of said carriage.

ALBERN B. JONES.

REFERENCES CITED

The following references are of record in the file of this patent:

UNITED STATES PATENTS

| Number | Name | Date |
|---|---|---|
| 385,435 | Watson | July 3, 1888 |
| 982,781 | Arps | Jan. 31, 1911 |
| 1,022,843 | Hanson | Apr. 9, 1912 |
| 1,152,326 | Lewis | Aug. 31, 1915 |
| 1,441,698 | Meem | Jan. 9, 1923 |
| 1,569,764 | Lockwood | Jan. 12, 1926 |
| 1,600,701 | Sommer | Sept. 21, 1926 |
| 1,852,796 | Bennett | Apr. 5, 1932 |
| 1,866,381 | Ward | July 5, 1932 |
| 1,910,481 | Smith | May 23, 1933 |
| 2,386,615 | Knapp | Oct. 9, 1945 |

FOREIGN PATENTS

| Number | Country | Date |
|---|---|---|
| 862,220 | France | Nov. 30, 1940 |